Aug. 11, 1925.
A. L. SCHON
1,548,905
SHOCK ABSORBER
Filed Oct. 23, 1923   2 Sheets-Sheet 1
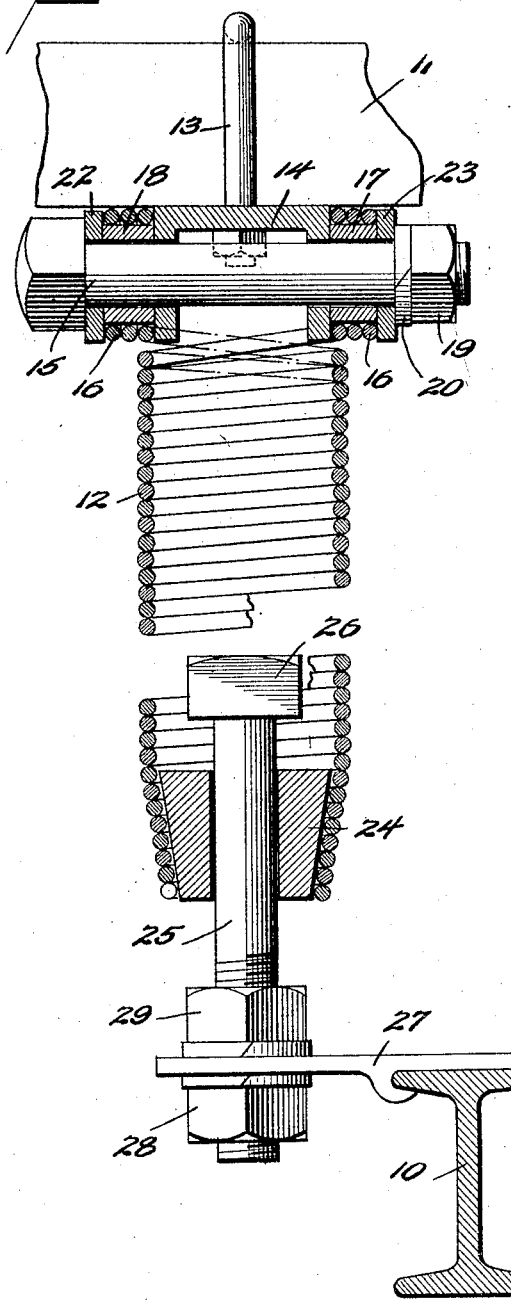
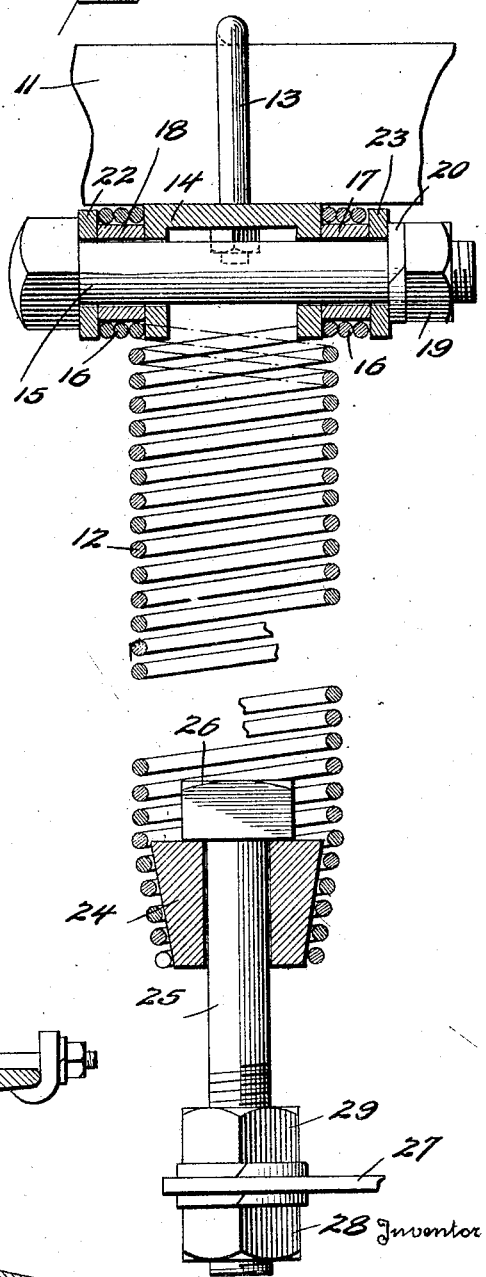
Inventor
August L. Schon
By
Edward C. Sasnett
Attorney

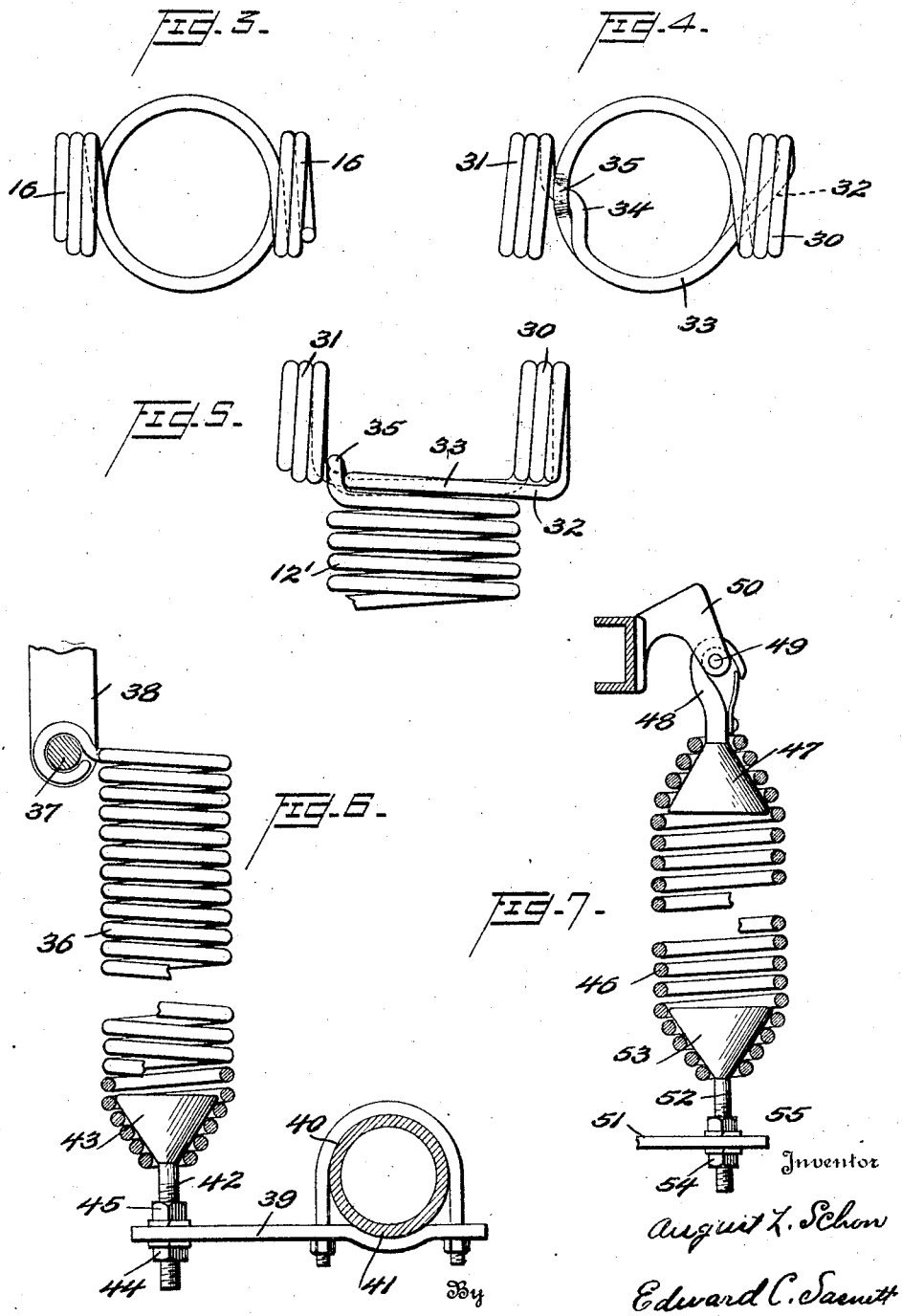

Patented Aug. 11, 1925.

1,548,905

UNITED STATES PATENT OFFICE.

AUGUST L. SCHON, OF DALLAS, TEXAS.

SHOCK ABSORBER.

Application filed October 23, 1923. Serial No. 670,275.

*To all whom it may concern:*

Be it known that AUGUST L. SCHON, a citizen of Luxemburg, and a resident of Dallas, in the county of Dallas and State of Texas, has invented certain new and useful Improvements in Shock Absorbers, of which the following is a specification.

My invention relates to shock absorbers for vehicles and particularly, motor vehicles.

The object of my invention, in general, is to produce a shock absorber which can be manufactured at a comparatively small cost, is strong, durable and highly efficient, and which can be assembled and adjusted with facility. More particular objects and advantages of the invention will be described hereinafter with reference to the accompanying drawings, of which Figure 1 is a sectional view of the preferred form of my invention, illustrating the relative positions assumed by the parts when the vehicle springs are under maximum compression.

Figure 2 is a view similar to Figure 1, illustrating the relative positions of the parts when the vehicle springs are under normal compresion.

Figure 3 is a plan view of the coiled spring shown in Figures 1 and 2.

Figures 4 and 5 are plan and side views, respectively, of a modified form of spring.

Figures 6 and 7 are sectional views illustrating further modifications.

With particular reference to Figs 1, 2 and 3, the numeral 10 designates the front axle of a motor vehicle, a part of the chassis of which is shown at 11. Disposed between axle 10 and chassis 11 is a spring 12, which is supported at its upper end on a bolt 15 mounted in a bracket 14 secured to the chassis by a U bolt 13 or other suitable means. Bracket 14 is preferably of inverted U form in cross section and is provided in its flanges with a pair of horizontally aligned apertures through which bolts 15 passes. In the form of the invention illustrated by Figures 1, 2 and 3, the spring 12 is constituted by two separate strands coiled together, the coils of one strand lying between the coils of the other. The upper ends of these strands are formed into supporting coils 16, which project laterally with respect to coil 12 and are arranged coaxially with their common axis intersecting the axis of coil 12 at a right angle. The coils 16 are provided with bushings 17 and 18 bearing on bolt 15. The parts are clamped in assembled position by a nut 19 which is frictionally locked by a spring washer 20, washers 22 and 23 being interposed between the bushings and the clamping surfaces.

As illustrated, the coils of spring 12, beginning near the lower end, have a gradually decreasing diameter, forming a tapered or conical end portion. A frustro-conical bushing 24 of suitable material is fitted in said tapered end and is provided with an axial hole through which passes freely a bolt 25 of standard form. In the normal position of the parts the head 26 of the bolt is seated on the upper end of bushing 24, as shown in Figure 2, thereby limiting the upward movement of the end of spring 12. The threaded end of bolt 25 is adjustably fixed to a bracket 27 by means of an adjusting nut 28 and a lock nut 29. Bracket 27 is detachably mounted on axle 10 by any suitable means.

The present invention does not include specific constructions of brackets for detachably mounting the shock absorber on the axle and chassis of the vehicle, and so far as the invention is concerned any suitable constuction may be employed. Obviously the particular form of bracket and securing means therefor will be governed largely by the type of vehicle. The bracket 27 shown in Fig. 1 is adapted to be applied to a front axle of I-beam form. The rear axle and other forms of front axle will naturally require modifications. It will also be understood that the bracket construction for securing the upper end of the spring will vary according to the type of vehicle.

Four shock absorbers such as described will be used per vehicle, two at the front and two at the rear. In assembling the device, brackets 14 and 27 are first clamped in the correct positions; then the coils 16, with bushings 17 and 18 therein are brought into alignment with the apertures in bracket 14, and the bolt 15 carrying washer 22 is inserted and clamped by screwing up nut 19. The bolt 25, which had previously been inserted through the upper open end of coil 12 and the nut 29 screwed up thereon, is then raised over bracket 27 and permitted to drop through the aperture therein until stopped by head 26 contacting bushing 24. The adjusting nut 28 is then screwed up until the desired amount of tension has been put on spring 12, whereupon the locking nut is screwed down and tightened, maintaining the bolt securely in its adjusted position. It will thus be clear that the device can be assembled with great facility, and can be accurately adjusted at will to suit any conditions of road, stiffness of the vehicle springs, load on the vehicle etc.

Figures 4 and 5 illustrate a coiled spring of modified form. In this form the spring consists of a single strand coiled into a main portion 12' and then into the lateral attaching coils 30 and 31. After the main coil 12' is formed the strand is coiled at 30 and then led under 30 at 32 tangentially to the main coil and curved on the radius of the main coil for about 100 degrees, at 33, then bent inwardly at 34 and led through an eye formed by a bent-up portion 35 of the main coil, and finally coiled to form 31. The lower part of 12' may have a tapering form to support a conical bushing such as shown in Figs. 1 and 2.

Fig. 6 illustrates a device embodying the broad principle of my invention but having some features of construction dissimilar to the corresponding features of the preferred form. Here the spring 36 is formed by coiling a single strand into a cylindrical portion and a conical lower end. The upper end of the spring is secured by a single coil to a bolt 37 mounted in a bracket 38 fixed to the chassis by any suitable means. The lower end of the spring is connected to a bracket 39 secured by a bolt 40 to the tubular rear axle 41, the connection including a bolt 42 having an integral conical head 43 which is adapted to fit in the conical end of the spring, the threaded portion of the bolt carrying an adjusting nut 44 and a locking nut 45.

In the forms of the invention thus far described the coiled spring is formed with an open upper end, permitting at will the insertion or removal of the bolt with its conical head (Fig. 6), or the bolt and frustro-conical bushing (Figs. 1 and 2). Figure 7 illustrates a construction in which the spring 46 has both its lower and upper portions tapering. In the upper end is a conical member 47 which is formed with or suitably attached to a snap hook 48 adapted to hook over a bolt 49 secured to a bracket 50 on the chassis. The lower end of the spring is connected to a bracket 51 on the axle by a bolt 52 having a conical head fitting in tapered lower end of the spring, the bolt being adjustably secured to the bracket by an adjusting nut 54 and a lock nut 55, as in the constructions previously described.

Referring more particularly to Figures 1 and 2 for a discussion of the operation, the spring 12 is normally under a certain tension the degree of which may be varied, as heretofore pointed out, to suit the particular conditions of use. On slight compressions of the vehicle springs there is no movement of bolt 25 in bushing 24, as the tension of the spring is not wholly taken up; but when the vehicle springs are compressed violently the tension of the spring 12 is taken up, and the bolt 25 moves relatively to bushing 24 to a position such as shown in Figure 1. On the rebound, head 26 comes in contact with bushing 24 causing the tension of spring 12 to be opposed to the rebounding movement. The normal tension of springs 12 is so adjusted as regards road conditions, stiffness of the vehicle springs etc., that all rebounding of the car body past the normal or natural position of the car springs is checked or substantially eliminated by the cushioning effect of springs 12. It is to be observed that during the working of the device there is no movement of bolt 25 relatively to its support nor any relative movement between the connections at the upper end of the spring. Friction therefore is reduced to a minimum. Spring 12 moves freely on bolt 25, the bolt having a loose enough fit in the bushing to eliminate friction between the working surfaces or any binding action.

Obviously various modifications other than those described may be made in the constructional features of my invention without departing from the essential idea of means disclosed, and I therefore do not intend to limit the scope of my invention except as defined in the claims appended hereto.

I claim:

1. A shock absorber for vehicles comprising a coiled spring, means for detachably securing the upper end of said spring to the chassis of the vehicle, a bushing secured in the lower end of said spring, a bolt passing axially through said bushing and having a head normally seated thereon, said bolt being freely slidable in the bushing, a bracket secured to the axle of the vehicle, and means for adjustably securing said bolt to said bracket.

2. A shock absorber for vehicles comprising a coiled spring having a tapered lower end, means for attaching the upper end of said spring to the chassis of the vehicle, a conical bushing seated in said tapered end, a bolt passing loosely through said bushing and having a head normally seated thereon, a bracket secured to the axle of the vehicle, and means for adjustably fastening the lower end of said bolt to said bracket.

3. A shock absorber for vehicles comprising a coiled spring consisting of a main coil and two lateral coils at the upper end of the main coil arranged coaxially and with their common axis substantially intersecting the axis of said main coil, a bracket secured to the chassis of the vehicle, a bolt passing through said bracket and through said lateral coils, means for clamping said bolt to the bracket, and means for connecting the lower end of the main coil to the axle of the vehicle, said connecting means permitting a limited free axial movement of the main coil relatively to said axle.

4. A shock absorber for vehicles comprising a coiled spring consisting of a main coil and two lateral coils at the upper end thereof arranged coaxially and with their common axis substantially intersecting the axis of the main coil, a bracket secured to the chassis of the vehicle, a bolt passing through said bracket and through said lateral coils, means for clamping said bolt to the bracket, a bushing secured in the lower end of the main coil, a bolt passing through said bushing axially thereof and having a head normally seated on the upper end of said bushing, a bracket secured to the axle of the vehicle, the lower threaded end of said bolt passing through said bracket, and nuts on said bolt above and below said bracket for adjusting and locking said bolt.

5. A shock absorber for vehicles comprising a coiled spring consisting of two separate strands coiled together to form a main coil and having their upper end portions formed into two lateral coils arranged coaxially and with their common axis substantially intersecting the axis of the main coil at a right angle, a bolt passing through said lateral coils and attached to the chassis of the vehicle, means for connecting the lower end of the main coil to the axle of the vehicle, said connecting means permitting a limited free axial movement of the main coil relatively to the axle.

6. A shock absorber for vehicles comprising a coiled spring consisting of two separate strands coiled together to form a main coil and having their upper end portions formed into two lateral coils arranged coaxially and with their common axis substantially intersecting the axis of the main coil at a right angle, a bracket secured to the chassis of the vehicle, a bolt passing through said bracket and through said lateral coils, means for clamping said bolt to the bracket, a bushing supported in the lower end of the main coil, a bolt passing through said bushing axially thereof and having a head normally seated thereon, said bolt being freely slidable in said bushing, a bracket secured to the axle of the vehicle, and means for adjustably fastening said bolt to said bracket.

In testimony whereof I hereunto affix my signature.

AUGUST L. SCHON.